Nov. 11, 1969 — T. R. BOYD ET AL — 3,477,333

RELEASABLE FASTENING DEVICE

Filed Nov. 21, 1966 — 2 Sheets-Sheet 1

INVENTORS
THOMAS R. BOYD,
FRANK J. COSENZA,
ALBERT K. YAMAMOTO

By Smyth, Roston & Pavitt
ATTORNEYS

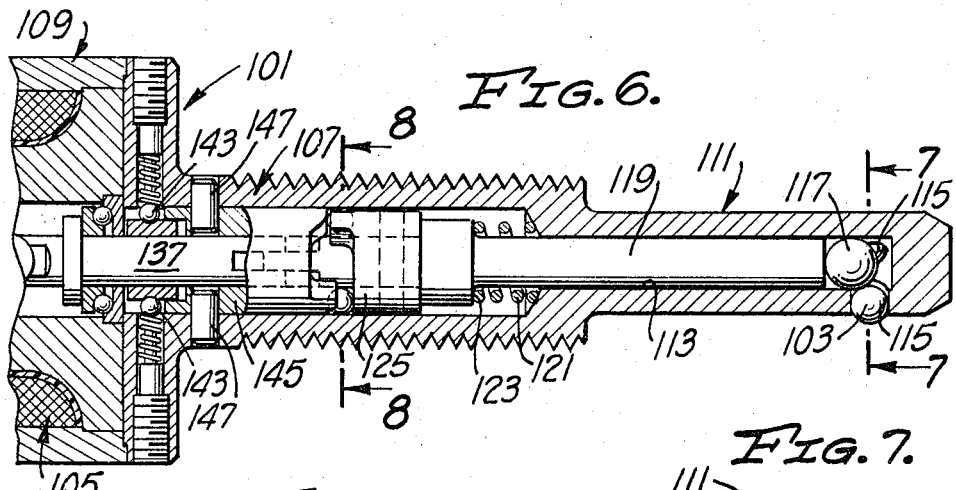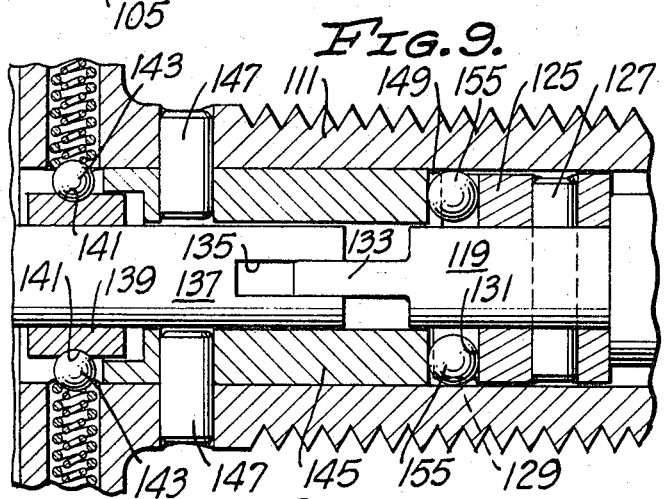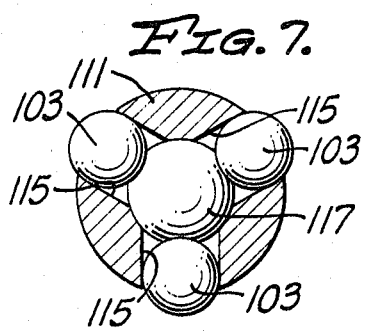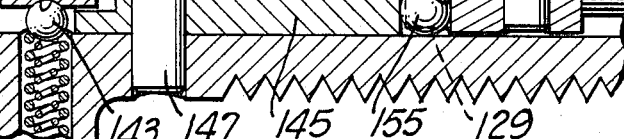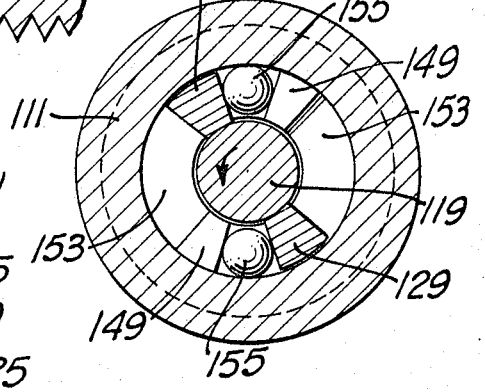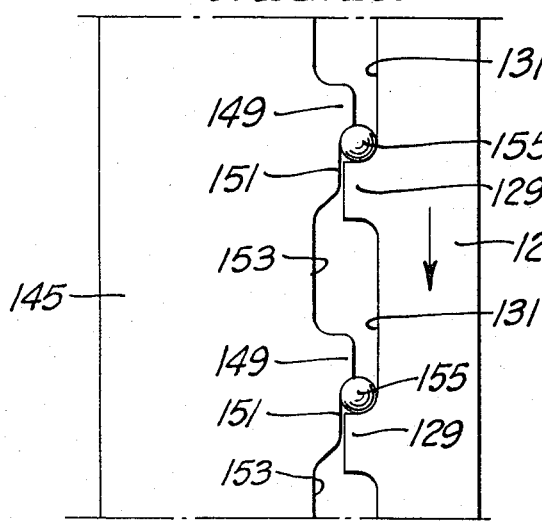
INVENTORS
THOMAS R. BOYD,
FRANK J. COSENZA,
ALBERT K. YAMAMOTO
ATTORNEYS

United States Patent Office 3,477,333
Patented Nov. 11, 1969

3,477,333
RELEASABLE FASTENING DEVICE
Thomas R. Boyd, Rolling Hills Estates, Frank J. Cosenza, Palos Verdes Peninsula, and Albert K. Yamamoto, Huntington Beach, Calif., assignors, by mesne assignments, to Tridair Industries, Redondo Beach, Calif.
Filed Nov. 21, 1966, Ser. No. 595,659
Int. Cl. F16b *19/00;* F42b *15/10*
U.S. Cl. 85—5                           13 Claims

ABSTRACT OF THE DISCLOSURE

This disclosure describes a releasable fastener which may include a body member having a passageway therein and at least one port extending from the passageway to the exterior of the body member. A detent member is mounted in the port for movement between locking and releasing positions and actuator means which is mounted for movement within the passageway controls the movement of the detent member. The actuator means is in turn controlled by a solenoid.

---

This invention relates to a releasable fastening device and more particularly to a solenoid-actuated detent lock mechanism. The fastening device of this invention can be used for many applications where a strong releasable connection is required and is particularly adapted for interconnecting the stages of a missile.

As is well known, missiles and rockets are frequently constructed in stages and the stages are releasably interconnected so that when one stage "burns out" it is separated or jettisoned from the remainder of the missile. Prior art devices for accomplishing this usually require the use of explosives, such as explosive bolts or detonating cord. The explosive is detonated to sever or destroy the structural members that serve to retain the missile stages together.

These explosive connectors are unsatisfactory in that they cannot be tested before they are used. Thus, if an explosive connector has a defect that prevents proper operation thereof and if such defect is not readily ascertainable upon visual inspection, the defective connector would be installed in the missile and may cause failure of the missile flight. This is very costly and may even result in loss of life.

Furthermore, explosive connectors, when actuated, may cause severe shock loading on the missile. Such shock loading may cause damage to the portions of the missile adjacent the connector and could damage any delicate instrumentation carried by the missile. In addition, inherent in the use of explosive connectors is the danger of accidental detonation of the explosive as by stray currents or inadvertent actuation of the firing circuit thereof.

According to the present invention, all of the above-noted difficulties are eliminated. More particularly, when the releasable fastening device of this invention is utilized for missile stage interconnection there is no shock loading upon actuation of the device and resultant stage separation. Furthermore, the releasable fastening device of this invention can be tested as often and as rigorously as desired before installing it in the missile. Finally, the present invention eliminates the need for explosives in a missile stage separating device and accordingly all of the safety problems associated with explosives are eliminated.

Manually operated connectors of this type, including a hollow shank, a detent ball mounted in a radial aperture in the shank, and a manual operating rod for controlling movement of the detent ball in the radial passageway are known. The operating rod is manually movable to cause operation of the connector. Because they are manually operated, connectors of this type are not suited for missile use and for many other applications.

The connector of this invention is operated automatically and electrically by electrical motor means, such as a solenoid. Although either linear or rotary solenoids may be used, the rotary solenoid is preferred for applications where low weight is desirable. A rotary solenoid produces a mechanical advantage and linear solenoids generally do not and, therefore, a smaller and correspondingly lighter rotary solenoid may be used to produce a given output.

When used to interconnect missile stages, the invention may include first and second adjacent missile stages, locking means for releasably connecting the missile stages together, and solenoid means for releasing the locking means to allow separation of the missile stages.

The releasable fastening device of this invention may include a body member having a passageway therein and at least one port extending from the passageway to the exterior of the body member and a detent member or ball mounted for movement in the port between a locking position and a releasing position. Preferably, in the locking position the detent member will protrude at least slightly radially outwardly of the port to engage a portion of the missile stage or other member upon which the fastening device is being used. Movement of the detent member within the port is controlled by actuator means disposed at least partially within the passageway. Electrical motor means, such as a solenoid, is operative to drive the actuator means to allow the detent member to either be retained in the locking position or be allowed to retract to the releasing position.

To assure that the solenoid will not fail to energize, the solenoid preferably includes two separate coils which are energizable separately. Thus, should one of the coils fail to energize, the other of the coils would energize to cause operation of the releasable fastening device. One such type of solenoid is a rotary solenoid in which the two separate coils are wound together about the same core and is illustrated in U.S. Patent No. 2,989,871.

After the solenoid has been energized, it is desirable to open the circuit thereto. With the present invention, this result is accomplished by a self-interrupter switch which is preferably mounted on the solenoid housing.

According to one preferred practice of this invention, the actuator means for controlling the movement of the detent member includes a rotatable actuator shaft mounted in the passageway of the body member and engageable with the detent member. The end portion of the actuator shaft constitutes a cam having a suitable contour for camming the detent member from the released position to the locking position upon rotation of the actuator shaft. The cam can maintain the detent member in the locking position and when the actuator shaft is rotated in the opposite direction, the cam allows the detent member to retract to the releasing position. Preferably, the detent member is a detent ball and several of such balsl are utilized.

To rotate the actuator shaft to move the detent member to the locking position, a manually operable cocking lever is drivingly connected to the actuator shaft. A rotary solenoid is preferably utilized for rotating the actuator shaft in the opposite direction to allow the detent member to retract to the releasing position. The detent member is forced to the releasing position by the forces applied to the missile stages tending to separate them.

Although the embodiment of the invention described in the preceding paragraphs is very effective, it has been found that the force of friction tending to prevent rotation of the actuator shaft to allow retraction of the detent member is quite substantial. Factors which contribute to this relatively high frictional force are the sliding friction between the cam and the detent member and the magnitude and the direction of the large force tending to separate the missile stages. Because of this large frictional force, a large solenoid capable of delivering substantial output force must be utilized. This in turn increases the weight that the missile must carry.

Thus, where weight considerations are very important, it has been found desirable to utilize a rotatable ball in the passageway of the body member in lieu of the cam described above in the first embodiment. This results in point contact between the detent ball and the actuator ball which eliminates some of the friction that existed heretofore between the detent balls and the actuator shaft.

In the usual practice of this invention, the detent balls are forced inwardly to the releasing position by the forces tending to separate the two members and are interconnected by the fastener. In the first described embodiment, such force is applied through the detent balls as a radially directed force to the cam or actuator shaft. In the second embodiment, however, the actuator and detent balls are positioned so that a component of this force tends to move the actuator ball axially within the passageway. Thus, this positioning of the balls allows the forces tending to separate the two members to cam the detent and actuator balls from the locked to the released position. One example of such positioning of the actuator and detent balls is to space the center of the actuator ball axially of the center of the detent balls. This feature of the invention further reduces the power requirements for the solenoid.

To control the movement of the actuator ball, a rotatable and axially slidable actuator shaft is mounted in the passageway. A spring or other suitable biasing means is provided to bias the actuator shaft axially away from the detent ball. Such movement of the shaft is prevented, however, by a pair of locking balls that engage a shoulder on the shaft. A suitable cam surface is provided in the passageway on the other side of the locking balls. When the rotary solenoid turns the actuator shaft, the locking balls are forced into a groove to allow the spring and the force tending to separate the two members to push the actuator shaft away from the detent balls and to allow them to retract to the releasing position.

The invention, both as to its organization and method of operation, together with further features and advantages thereof, may best be understood by reference to the following description taken in connection with the accompanying illustrative drawings in which:

FIG. 6 is a fragmentary sectional view similar to FIG. 2 showing a second form of releasable fastener of this invention;

FIG. 7 is an enlarged sectional view taken along line 7—7 of FIG. 6 and showing the detent members in the locking position thereof;

FIG. 8 is an enlarged sectional view taken along line 8—8 of FIG. 6 showing the locking balls which restrain the movement of the actuator shaft;

FIG. 9 is an enlarged fragmentary sectional view of the actuator shaft and the restraining means therefor; and FIG. 10 is a schematic layout of the fixed and movable cams which restrain the locking balls.

Figure 1:
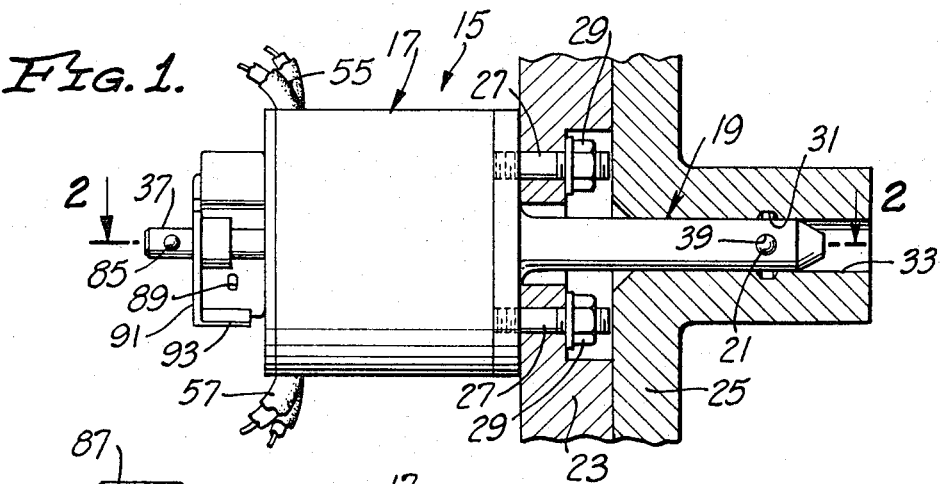
FIG. 1 is a side elevational view of one form of releasable fastener of this invention with the members interconnected thereby being illustrated in section.

Referring to the drawings and in particular to FIGS. 1–5, reference numeral 15 designates a releasable fastener constructed in accordance with the teachings of this invention. The releasable fastener includes a housing or body member 17 having a nose portion 19 carrying a plurality of detent members 21 which are preferably balls. As shown in FIG. 1, the releasable fastener 15 is utilized to interconnect members 23 and 25 which may be adjacent stages of a missile or rocket. The body member 17 is interconnected to the member 23 by any suitable means such as a plurality of bolts 27 and 29.

Although two of the detent balls are shown, other numbers thereof may be utilized. The balls 21 serve to interconnect the members 23 and 25 and in the embodiment shown accomplish this function by engaging an annular groove 31 in a passage 33 of the member 25.

The nose portion 19 has a passageway 35 therethrough which serves to rotatably mount an actuator shaft 37. A pair of ports 39 spaced 180 degrees apart extend radially outwardly from the passageway 35 to the exterior of the nose portion 19. The detent balls 21 are mounted for movement radially within the ports 39. The actuator shaft 37 is preferably generally cylindrical throughout a major portion of its length and has a pair of notches 41 (FIG. 3) formed in the outer end thereof to form a flattened end portion 43 of the shaft.

Figures 3, 4, 5:
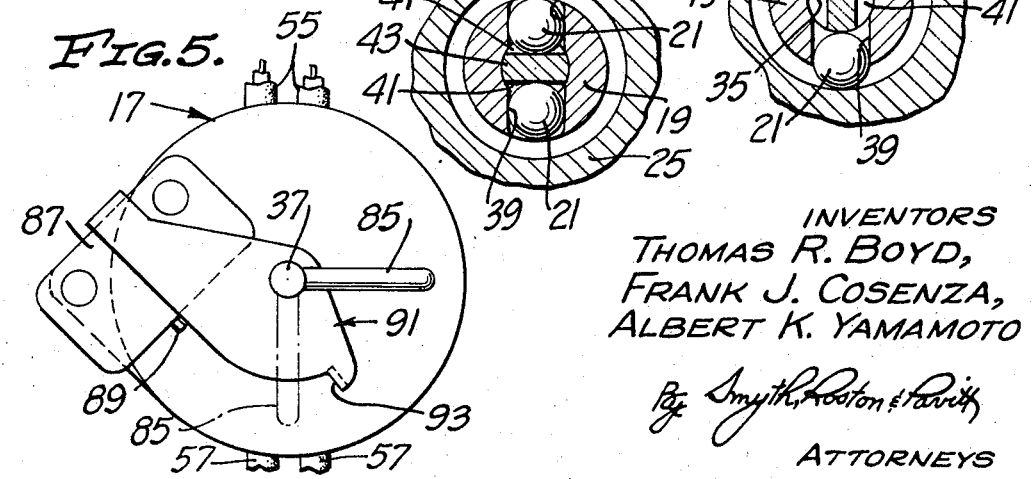
FIG. 3 is an enlarged fragmentary sectional view taken along line 3—3 of FIG. 2 and showing the detent members in the locking position thereof.
FIG. 4 is a fragmentary sectional view similar to FIG. 3 showing the detent members in the releasing position thereof.
FIG. 5 is an end elevational view of the releasable fastener illustrating the self interrupter switch therefor.

FIGS. 3 and 4 illustrate how rotation of the actuator shaft 37 through 90 degrees operates to move the detent balls 21 between a locking position and a releasing position. In FIG. 3 the actuator shaft 37 is rotated so that the flattened end portion 43 is operative to maintain the detent balls 21 in the locking position in which they are firmly seated within the annular groove 31 in the member 25. By rotating the actuator shaft 37 through 90 degrees to the position shown in FIG. 4, the notches 41 permit the detent balls 21 to be retracted to a releasing position in which they are no longer firmly seated in the annular groove 31. Thus, in the position shown in FIG. 4 the detent balls 21 lie completely within the radial ports 39. In actual use, the external force tending to separate the members 23 and 25 may be operative to cam the detent balls 21 radially inwardly to the releasing position shown in FIG. 4. In this instance, the actuator shaft 37 is operative to selectively allow such action to occur.

The body member 17 includes a shell portion 45, which, according to the preferred practice of the present invention, houses a rotary solenoid 47 which selectively rotates the actuator shaft 37 through 90 degrees.

The rotary solenoid 47 includes a fixed magnetic core 49 having a passageway therein aligned with the passageway 35 in the nose portion 19. A stator ring 51 is fixed within the shell portion 45 at the end thereof remote from the core 49. A pair of coils 53 of the type which can be wound together are wound around the core 49 adjacent the stator ring 51. The separately wound coils 53 have separate external electrical connections 55 and 57 (FIG. 1) so that the solenoid 47 can be energized by either of the coils acting independently.

The actuator shaft 37 extends axially completely through the shell 45 and is mounted therein by a bearing 59. The shaft 37 has a roller or ball 61 projecting radially thereof. A sleeve 63 is mounted on the actuator shaft 37 for axial and rotational movement with respect thereto. The sleeve 63 has a cam face 65 engaging the ball 61. The sleeve 63 is fixed to an armature 67 by suitable interconnecting means 69. The armature 67 is fixed against rotation relative to the fixed stator ring 51 by a tab or key 71 which permits axial movement of the armature relative to the stator rings.

Figure 2:
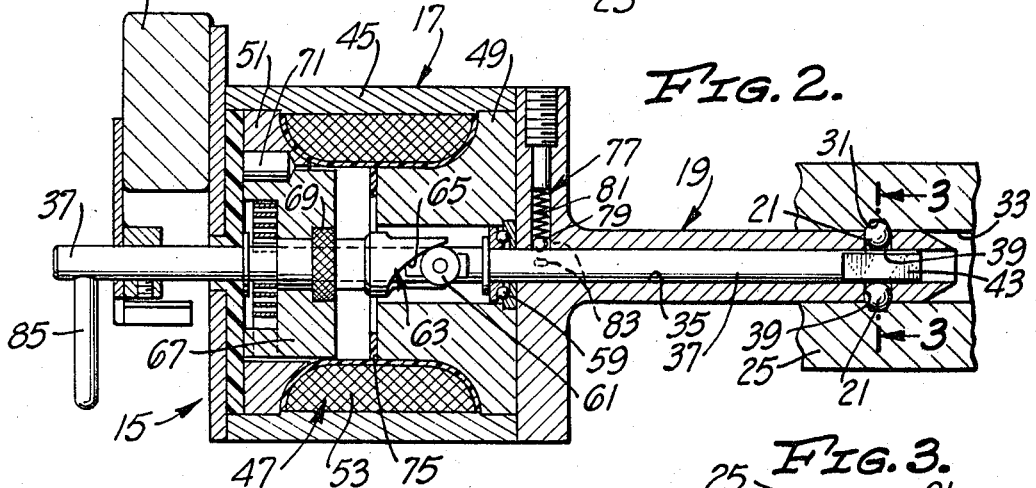
FIG. 2 is a fragmentary sectional view taken along line 2—2 of FIG. 1 and illustrating the components of the releasable fastener.

In the de-energized condition of the rotary solenoid 47, the armature 67 is spaced substantially from the core 49 as shown in FIG. 2. When one or both of the coils 53 are energized, the armature 67 is pulled toward the core 49 until it engages an annular spacer 75 which serves to maintain a minimum air gap between the armature and the core. As the armature 67 moves axially, it forces the sleeve 63 to move therewith, thereby causing the camming face 65 to act on the ball 61. This causes the actuator shaft 37 to rotate 90 degrees from the locking position shown in FIGS. 2 and 3 to the releasing position of FIG. 4. During this period, the key 71 prevents the armature 67 from rotating while allowing translation thereof. Thus, the armature 67 and the sleeve 63 translate axially to cause the actuator shaft 37 to rotate to the releasing position.

A detent mechanism 77 is provided for releasably retaining the actuator shaft 37 in either the locking or releasing position. The detent mechanism 77 may include a detent ball 79 and a spring 81 located in a passageway in the shell 45. The ball 79 is engageable sequentially with a suitable pair of grooves 83 spaced circumferentially on the actuator shaft 37 which correspond with the locking and releasing positions, respectively Thus, when the rotary solenoid 47 is energized, the cam 65 is operative to overcome the force of the spring 81 and rotate the actuator shaft 37 to the releasing position at which time the ball 79 snaps into the other groove 83.

It should be understood that various types of solenoids may be used to impart the desired movement to the actuator shaft 37. However, the rotary solenoid 47 described herein is preferred because the output torque thereof may be maintained substantially constant throughout the entire range of movement of the shaft or may be varied as required to meet the particular operating requirements. Although linear solenoids or other types of electrical motor means may be used, rotary solenoids are preferred where low weight and low power requirements are desirable.

The actuator shaft 37 extends completely through the shell 45. A cocking lever 85 may be connected to the exposed end portion of the actuator shaft 37 as best shown in FIGS. 2 and 5. Thus, prior to putting the releasable fastening means into use, the cocking lever 85 will be in the position shown in phantom lines in FIG. 5 and the actuator shaft 37 will be in the releasing position (FIG. 4). The detent device 77 will be operative to releasably maintain the components of the device in the releasing position. The cocking lever 85 may, at the desired moment, be manually rotated counterclockwise through 90 degrees to the position shown in full lines in FIG. 5 thereby manually camming the detent balls 21 to the locking position shown in FIG. 3. As the shaft 37 can rotate relative to the sleeve 63, the sleeve will not preclude such rotation of the shaft.

It is desirable to open the circuit to the coils 53 once the solenoid has been actuated and the actuator shaft 37 is rotated accordingly. To accomplish this, a microswitch 87 is secured to one end of the body member 17. The microswitch 87 is operated by a button 89 and a plate 91 having a depending tooth 93 is operative to depress the button 89 upon movement of the actuator shaft to the releasing position. This opens the circuits through the connections 55 and 57 to the coils 53.

The embodiment described in FIGS. 1–5 is very effective for many applications. However, it is apparent that a component of the force tending to separate the members 23 and 25 will act on the detent balls 21 and tend to cam them radially inwardly in the ports 39. The balls 21 will in turn apply this force to the end portion 43 of the actuator shaft 37. The force of friction between the detent balls 21 and the end portions 43 which tends to resist rotation of the actuator shaft 37 to the releasing position is therefore quite significant. This force may have a sufficient magnitude so as to require increasing the size of the rotary solenoid 47. For applications where increasing the size of the solenoid is undesirable, such as in missiles where low weight and low power requirements are very desirable, the embodiment of FIG. 6–10 offers optimum results.

FIGS. 6–10 show a releasable fastener 101 which is similar to the releasable fastener of FIGS. 1–5 in that it employs a plurality of detent balls or members 103 which are maintained in a locking position (FIG. 7) by a rotary solenoid 105 acting through the actuator means 107. As in the previous embodiment, energization of the rotary solenoid 105 permits the detent balls 103 to be retracted to the releasing position. For simplicity, the external members 23 and 25 are not illustrated in FIGS. 6–10, it being understood that the detent balls 103 may be operative to effect a connection between such members. The embodiment of FIGS. 6–10 differs from the first described embodiment in the particular type of actuator means utilized to effect the desired control of the detent balls 103.

The releasable fastener 101 includes a body member or housing 109 for housing the rotary solenoid 105 and having a nose portion 111 with a passageway 113 extending a substantial axial distance therein. A plurality of radially extending ports 115 interconnect the outer end portion of the passageway 113 with the interior of the nose portion 111. As shown in FIG. 7, three of the ports 115 and three balls 103 are provided, it being understood, however, that various numbers of the balls and ports may be utilized.

The detent balls 103 are engaged by an actuator ball 117 which is movable axially in the passageway 113. The axial position of the actuator ball 117 within the passageway 113 is controlled by operating means which includes an actuator shaft 119 which is slidable and rotatable within the passageway 113.

With the actuator shaft 119 in the position shown in FIG. 6, the actuator ball 117 engages the three detent balls 103 and holds them in the locking position shown in FIG. 7. In this position, the actuator ball 117 and each of the detent balls 103 are in point contact and this substantially reduces the friction therebetween. Secondly, in the locking position the center of the actuator balls is spaced axially from the lines interconnecting the centers of the detent balls 103. Thus, a component of the force tending to separate the members interconnected by the releasable fastener 101 will act through the detent balls 103 and against the actuator ball 117. Because of the positioning of the actuator ball relative to the detent balls 103, this component of force will tend to move the actuator ball axially within the passageway 113 to the releasing position. Thus, when the actuator shaft 119 is retracted to allow the balls 103 to move to the releasing position, the force tending to separate the two members interconnected by the releasable fastener 101 will not hinder or resist movement to the releasing position but will assist such movement. Accordingly, only a slight force is needed to retract the actuator shaft 119 to the releasing position.

Various types of operating means for controlling the movement of the actuator ball 117 may be utilized. However, it is preferred to utilize operating means which permit the use of a rotary solenoid and which is responsive to such rotary movement to cause or permit axial movement of the actuator shaft 119. The details of a preferred form of such an actuator are illustrated in FIGS. 8–10.

The actuator shaft 119 is biased axially to the left as viewed in FIGS. 6 and 9 by a coil spring 121 acting against a shoulder 123 thereon. A collar 125 surrounds the actuator shaft 119 and is secured thereto by a pin 127. The inner end of the collar 125 has a pair of retaining lugs 129 (FIGS. 8–10) extending axially inwardly and spaced 180 degrees apart. Opposed valleys 131 lie intermediate the retaining lugs 129.

The inner end of the actuator shaft 119 terminates in a tongue 133 which is slidably received in a groove 135 of an actuator shaft extension 137. Thus, the shafts 119 and 137 cannot rotate relative to each other but can translate relative to each other. A collar 139 is fixed to the shaft 137 and has a pair of opposite grooves 141 in the outer periphery thereof. Suitable detent devices 143 resiliently engage the grooves 141 to maintain the shaft 119 and the balls 103 in the locking position thereof and are similarly engageable with a second pair of grooves disposed 90 degrees from the grooves 141 to fix the releasing position of the detent balls 103.

A fixed restraining member 145 in the form of a sleeve is secured by pins 147 to the nose portion 111. The outer end of the fixed restraining member 145 has a pair of stops 149 extending axially thereof and the surface of the restraining member intermediate the stops 149 forms plateaus 151 and valleys 153.

A pair of locking balls 155 are held captive between adjacent pairs of the retaining lug 129 and the stop 149 as shown in FIGS. 8 and 9. FIG. 10 indicates schematically how the locking balls 155 are retained by the retaining lugs 129 and the stops 149 when the detent balls 103 are in the locking position. The valleys 131 of the collar 125 bear against the balls 155 to retain the collar 125 and shaft 119 in the locking position.

Assuming that the components of the device are in the locking position as shown in FIGS. 6–10, energization of the rotary solenoid 105, which is preferably identical to the rotary solenoid 47, causes the actuator shaft extension 137 to rotate through 90 degrees. This causes the actuator shaft 119 and the collar 125 to rotate through 90 degrees in the direction of the arrows in FIGS. 8 and 10. Such rotation of the collar 125 causes a corresponding rotation of the retaining lugs 129. As the locking balls 155 are no longer retained by the retaining lugs 129, they are free to roll down the plateaus 151 into the valleys 153. There is no sliding friction between the collar 125 and the sleeve 145 as the balls 155 roll between the surfaces 131 and 151. With the locking balls 155 disposed in the valleys 153, they no longer restrain the collar 125 and the shaft 119 in the locking position and therefore the collar and the actuating shaft 119 are free to move axially to the left a limited distance under the influence of the coil spring 121. Such axial movement of the actuator shaft 119 allows a corresponding inward axial movement of the actuator ball 117 which in turn permits retraction of the detent balls 103 to the releasing position in which they are disposed radially inwardly of the locking position shown in FIG. 7. Thus, the actuator shaft 119 is first rotated to release the restraining means or balls 155 to permit the actuator shaft 119 to move axially to allow the detent balls 103 to retract to the releasing position.

If desired, the solenoid 105 may be provided with a cocking lever and a microswitch similar to the cocking lever and microswitch illustrated in FIGS. 1–5. It is apparent that with the components of the device in the releasing position, the manual movement of a locking lever to rotate the collar 125 in the opposite direction would cause the retaining lugs 121 to cam the corresponding locking ball 155 upwardly along the plateaus 151 and into engagement with the stops 149 as shown in FIG. 10.

Although exemplary embodiments of the invention have been shown and described, many changes, modifications, and substitutions may be made by one having ordinary skill in the art without necessarily departing from the spirit and scope of this invention.

What is claimed is:

1. In a releasable fastener for interconnecting first and second members wherein the fastener is connectable to the first member and the second member has a locking recess therein, the combination of:
    a body member connectible to the first member, said body member having a passageway therein and at least one port extending from said passageway to the exterior of said body member;
    a detent member mounted for movement in said port, said detent member being movable in said port between a locking position in which said detent member is positioned outwardly in said port and a releasing position in which said detent member is retracted inwardly of said locking position;
    actuator means engageable with said detent member and movable to a first position within said passageway to urge said detent member to said locking position, said actuator means being movable to a second position in which said actuator means allows said detent member to be retracted to said releasing position; and
    solenoid means mounted on said body member for driving said actuator means to cause said actuator means to assume said second position to thereby allow said detent member to assume said releasing position.

2. A combination as defined in claim 1 wherein said solenoid means drives said actuator means from said first position to said second position.

3. A combination as defined in claim 1 wherein said solenoid means has a core with a passageway therein, said actuator means including a shaft portion projecting into said passageway and movable therein in response to energization of the solenoid.

4. In a releasable fastener, the combination of:
    a body member having a passageway therein and at least one port extending from said passageway to the exterior of said body member;
    a detent member mounted for movement in said port, said detent member being movable in said port between a locking position in which said detent member is positioned outwardly in said port and a releasing position in which said detent member is retracted inwardly of said locking position;
    an actuator shaft engageable with said detent member and rotatable in said passageway to a first position for directly driving said detent member to said locking position, said actuator shaft being rotatable to a second position in which said actuator member allows said detent member to be retracted to said releasing position, said actuator shaft being retained against substantial axial movement within said passageway; and
    rotary solenoid means for rotating said actuator shaft from said first position to said second position to allow said detent member to retract to said releasing position.

5. A combination as defined in claim 4 including a self-interrupter switch for shutting off current to said solenoid after said solenoid has been energized.

6. A combination as defined in claim 4 including a manual cocking lever drivingly connected to said shaft for rotating said shaft to urge said detent member to said locking position.

7. In a releasable fastener, the combination of:
    a body member having a passageway therein and at least one port extending from said passageway to the exterior of said body member;
    a detent member mounted for movement in said port, said detent member being movable in said port between a locking position in which said detent member is positioned outwardly in said port and a releasing position in which said detent member is retracted inwardly of said locking position;
    an actuator shaft means mounted for generally axial and rotational movement in said passageway, said actuator shaft means being axially movable between a first position in which it holds said detent member in said locked position thereof and a second position in which it permits said detent member to move to said releasing position;
    means for biasing said actuator shaft means toward said second position thereof;
    releasable restraining means for holding said actuator shaft means in said first position against the influence of said biasing means;
    rotary solenoid means for imparting rotary motion to said actuator shaft means; and
    means responsive to the rotation of said actuator shaft means for releasing said releasable restraining means to allow said biasing means to move said shaft toward said second position thereof.

8. A combination as defined in claim 7 wherein said detent member includes a detent ball and said actuator shaft means includes an actuator ball engageable with said detent ball and an actuator shaft movable axially in said passageway to control the position of said actuator ball.

9. A combination as defined in claim 7 wherein said restraining means includes a restraining member mounted in said body member adjacent said actuator shaft means and a restraining ball engaging said restraining member and said actuator shaft means, one of said restraining member and actuator shaft means having recess means therein into which said restraining ball is urged in response to rotary motion of said actuator shaft means to thereby permit axial movement of the actuator shaft means to said second position.

10. A combination as defined in claim 9 in which said restraining member is hollow and said actuator shaft means projects therethrough to said solenoid means.

11. A combination as defined in claim 7 wherein said restraining means includes bearing means for permitting said actuator shaft to undergo low friction rotary movement.

12. In a missile, the combination of:
a first missile section;
a fastener housing mounted on said first missile section, said housing having a passageway therein and at least one port extending from said passageway to the exterior of said housing;
a second missile section adjacent said first missile section and having a locking shoulder, a portion of said housing extending toward said second missile section to position said port adjacent said locking shoulder;
a detent member mounted for movement in said port between a locking position in which said detent member lockingly engages said shoulder and a releasing position in which said detent member is positioned radially inwardly of said locking position;
actuator means engageable with said detent member and movable to a first position within said passageway to urge said detent member to said locking position, said actuator means being movable to a second position in which said actuator means allows said detent member to be retracted to said releasing position; and
solenoid means mounted on said body member for driving said actuator means to cause said actuator means to assume said second position to thereby allow said detent member to assume said releasing position whereby said missile sections can separate.

13. A combination as defined in claim 12 including a manual cocking lever drivingly connected to said actuator means for moving said actuator means to said first position.

References Cited

UNITED STATES PATENTS

| | | | |
|---|---|---|---|
| 1,635,144 | 7/1927 | Stevens | 85—5 |
| 2,232,340 | 2/1941 | Olson | 85—5 |
| 2,655,105 | 10/1953 | Hansche | 102—49.4 |
| 3,024,703 | 3/1962 | Herold | 89—1.811 |
| 3,068,737 | 12/1962 | Mewse | 85—5 |
| 3,145,441 | 8/1964 | Strandrud | 85—5 |
| 3,302,960 | 2/1967 | Herrmann | 85—5 |
| 3,319,978 | 5/1967 | Melhose | 102—49.4 |
| 1,243,338 | 10/1917 | O'Grady | 85—5 |

FOREIGN PATENTS 971,537   9/1964   Great Britain.

EDWARD C. ALLEN, Primary Examiner

U.S. Cl. X.R.

102—49.4